J. H. BLESSING.
Steam Trap.
No. 234,386.  Patented Nov. 16, 1880.
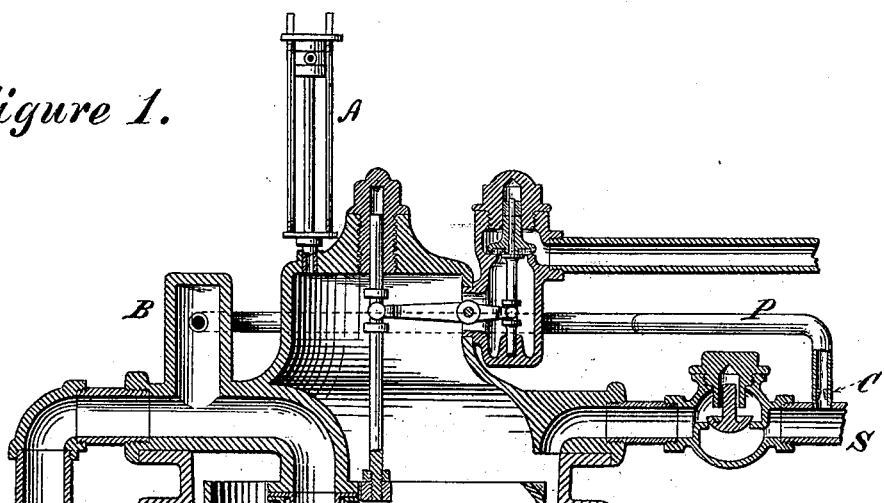
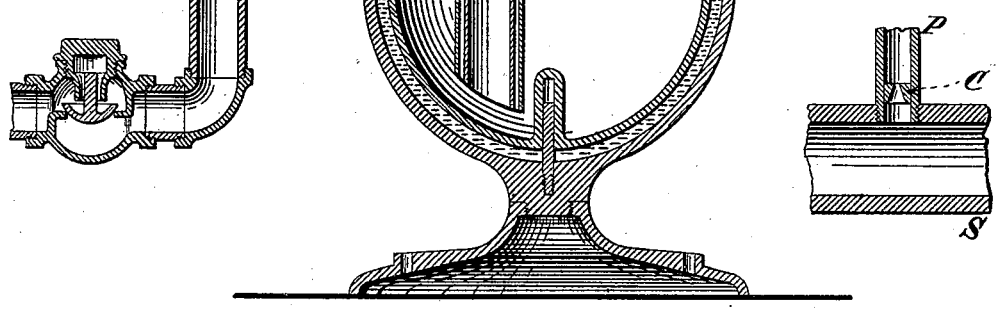

UNITED STATES PATENT OFFICE.

JAMES H. BLESSING, OF ALBANY, NEW YORK, ASSIGNOR TO THE ALBANY STEAM TRAP COMPANY, OF SAME PLACE.

STEAM-TRAP.

SPECIFICATION forming part of Letters Patent No. 234,386, dated November 16, 1880.

Application filed November 28, 1879.

*To all whom it may concern:*

Be it known that I, JAMES H. BLESSING, of the city of Albany and State of New York, have invented a new and useful Improvement in Steam-Traps, of which the following is a full, clear, and exact description, reference being had to the accompanying drawings, in which—

Figure 1 is a vertical cross-section of my steam-trap. Fig. 2 is an enlarged detail view of the choke-block.

This invention relates to an improvement for freeing the return-pipe from a steam-trap to a boiler of any air which may accumulate in it, and is shown as applied to the automatic bucket-trap patented to me on the 27th day of August, 1878, No. 207,484, to which reference is made for a full description.

It is found in practice that the air is very likely to accumulate, especially when the trap is not working, in the pipes and connections, both between the boiler and the trap in the coils, and in the connection between the trap and the boiler. To free the trap of this air an automatic air-valve, A, is attached to its upper portion, and it is evident that any air which is forced into the trap from the supply-pipe S will be automatically passed from the trap by means of this air-valve A; but if the delivery-pipe D should become filled with air it is apparent that such air would prevent the operation of the siphon which is formed by this pipe, and consequently the operation of the trap.

It is found by experience that the pressure of steam at the end of a system of coils is appreciably less than the pressure existing in the boiler. I have utilized this fact by attaching a pipe, P, which communicates between the delivery-pipe D and the supply-pipe S, and is provided with a partial plug or choke-block, C.

When the bucket is full of water and down, the pressure in the trap is the boiler-pressure. If, therefore, there were any air existing in the pipe D, it would be forced around through the pipe P into the pipe S, and would thence flow into the trap again to escape through the air-valve. This opening is necessarily made very small, so as not to interfere with the operation of the trap, and I prefer to make the choke-block C of steel or some other hard material. By means of the escape of air from the delivery-pipe D said pipe becomes gradually filled with water to a sufficient height to cause the siphon to operate when the trap resumes its proper function, any air entering it escaping through the air-valve A.

It is found in practice that by means of this connection a trap filled with air will start itself when steam is made in the boiler without the necessity of blowing off.

What I claim as my invention, and desire to secure by Letters Patent, is—

1. An automatic steam-trap provided with a tube connecting the water-supply and delivery pipes, whereby the air from the delivery-pipe is returned into the trap, substantially as described.

2. An automatic steam-trap provided with an air-valve, and with a tube connecting the supply and delivery pipes, whereby the air from the delivery-pipe is returned into the trap, whence it escapes, substantially as described.

3. An automatic steam-trap provided with an air-valve and with a tube connecting the supply and delivery pipes, whereby the air from the delivery-pipe is returned into the trap, whence it escapes, said tube being provided with a choke-block, or its equivalent, for reducing its aperture, substantially as described.

JAMES H. BLESSING.

Witnesses:
S. F. SULLIVAN,
WM. A. POLLOCK.